US008434381B2

(12) United States Patent
Olausson

(10) Patent No.: US 8,434,381 B2
(45) Date of Patent: May 7, 2013

(54) TRANSMISSION FOR A MOTOR VEHICLE

(75) Inventor: Lennart Olausson, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 12/869,037

(22) Filed: Aug. 26, 2010

(65) Prior Publication Data

US 2011/0107861 A1 May 12, 2011

(30) Foreign Application Priority Data

Aug. 28, 2009 (GB) .................................. 0915092.1

(51) Int. Cl.
*F16H 3/38* (2006.01)

(52) U.S. Cl.
USPC ........................................................... 74/339

(58) Field of Classification Search .......... 74/339, 74/163; 192/85.01, 48.601, 3.57; 417/392
See application file for complete search history.

(56) References Cited

U.S. PATENT DOCUMENTS

| 5,669,265 | A | 9/1997 | Adler | |
|---|---|---|---|---|
| 6,647,719 | B2 * | 11/2003 | Truninger | 60/414 |
| 6,658,951 | B2 * | 12/2003 | Harries | 74/336 R |
| 7,150,288 | B2 * | 12/2006 | Long et al. | 137/112 |
| 7,287,442 | B2 * | 10/2007 | Gumpoltsberger | 74/331 |
| 7,410,438 | B2 * | 8/2008 | Moehlmann et al. | 475/116 |
| 7,730,801 | B2 * | 6/2010 | Baldascini et al. | 74/337.5 |
| 7,954,318 | B2 * | 6/2011 | Pritchard | 60/545 |
| 8,117,934 | B2 * | 2/2012 | Cronin | 74/335 |
| 2002/0082131 | A1 * | 6/2002 | Park et al. | 475/127 |
| 2007/0051580 | A1 * | 3/2007 | Gunderson et al. | 192/85 R |
| 2008/0067022 | A1 | 3/2008 | Schnitzer | |
| 2009/0111643 | A1 * | 4/2009 | Sah et al. | 477/5 |

FOREIGN PATENT DOCUMENTS

| DE | 10134115 A1 | 1/2003 |
|---|---|---|
| DE | 10316437 A1 | 10/2003 |
| DE | 10321530 A1 | 12/2004 |
| DE | 102006049972 A1 | 5/2008 |
| EP | 1431626 A1 | 6/2004 |
| EP | 1519081 A1 | 3/2005 |
| EP | 1519082 A1 | 3/2005 |
| GB | 983271 A | 2/1965 |
| GB | 1142506 A | 2/1969 |
| GB | 1287259 A | 8/1972 |
| GB | 1311557 A | 3/1973 |
| WO | 2007104276 A1 | 9/2007 |

* cited by examiner

*Primary Examiner* — Ha D Ho
*Assistant Examiner* — Jude Agendia
(74) *Attorney, Agent, or Firm* — Ingrassia Fisher & Lorenz, P.C.

(57) ABSTRACT

A transmission is provided that includes at least first and second rotatable shafts, at least first and second pairs of meshing gearwheels, each of which includes an idle gearwheel rotatably mounted on the second shaft, at least one synchronizer which is displaceable along said second shaft between first and second engaged positions in which it locks one of the idle gearwheels to the second shaft via a neutral position, and a hydraulic actuator for displacing the synchronizer. The actuator includes a cylinder and a piston which is displaceable within the cylinder delimiting first and second chambers. The volume of the first chamber is smallest when the actuator is in the first engaged position and the volume of the second chamber is smallest when the actuator is in the second engaged position. The piston further delimits at least a third chamber within the cylinder.

14 Claims, 2 Drawing Sheets

Fig. 3A

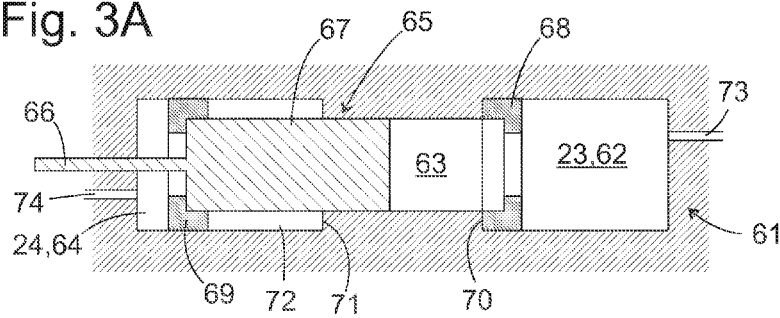

Fig. 3B

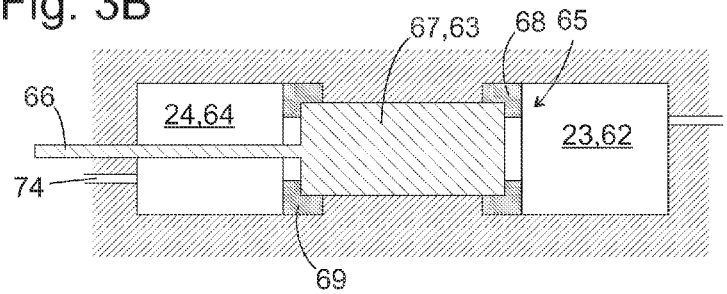

Fig. 4

| Way Valve Position | | | Gear | | | | | | | |
|---|---|---|---|---|---|---|---|---|---|---|
| 30 | 31 | 32 | R | 1 | 2 | 3 | 4 | 5 | 6 | 7 |
| odd | off | off | stby | ready | stby | ready | inacc. | inacc. | inacc. | inacc. |
| odd | off | on | stby | inacc. | stby | inacc. | inacc. | ready | inacc. | ready |
| odd | on | off | inacc. | inacc. | inacc. | inacc. | stby | ready | stby | ready |
| odd | on | on | inacc. | ready | inacc. | ready | stby | inacc. | stby | inacc. |
| even | off | off | ready | stby | ready | stby | inacc. | inacc. | inacc. | inacc. |
| even | off | on | ready | inacc. | ready | inacc. | inacc. | stby | inacc. | stby |
| even | on | off | inacc. | inacc. | inacc. | inacc. | ready | stby | ready | stby |
| even | on | on | inacc. | stby | inacc. | stby | ready | inacc. | ready | inacc. |

TRANSMISSION FOR A MOTOR VEHICLE

CROSS-REFERENCE TO RELATED APPLICATION

This application claims priority to British Patent Application No. 0915092.1, filed Aug. 28, 2009, which is incorporated herein by reference in its entirety.

TECHNICAL FIELD

The present invention relates to a transmission for a motor vehicle comprising at least first and second rotatable shafts, at least first and second pairs of meshing gearwheels, each of which comprises an idle gearwheel rotatably mounted on said second shaft, at least one synchronizer which is displaceable along said second shaft between first and second engaged positions in which it locks one or the other of said idle gearwheels to said second shaft via a neutral position, and a hydraulic actuator for displacing the synchronizer.

BACKGROUND

A transmission is known, e.g., from WO 2007/104 276. In this conventional transmission, there are four actuators and synchronizers associated to gears 1 and 3, 2 and 4, 5 and 7, 6 and reverse, respectively. A pressure regulator and a rotary way valve driven by a stepper motor are connected between a source and a drain for hydraulic fluid, on the one hand, and the four actuators on the other. Depending on the state of the pressure regulator, either first sides of all four actuators are connected to the source via the pressure regulator, and the second side of one of the actuators is connected to the drain via the way valve, whereas second sides of the other actuators are blocked, or the first sides are connected to the source via the pressure regulator, and a selected one of the actuators has its second side connected to the drain, whereas the others are blocked. In each state, one of the actuators can move, whereas the others can not. If this conventional transmission is in second gear, first or third gears can be pre-selected in order to enable interruption-free shifting to the pre-selected gear when necessary. Since first and third gears are associated to a same synchronizer, pre-selection can be changed from first to third gear or vice versa by shifting the synchronizer from one of its two engaged positions to the other. However, if e.g., the fourth gear is active, either the fifth or the third gear should be pre-selected. Since these are associated to different actuators, a change of the pre-selection requires two actuators to be displaced. This can only be done by first transferring the first actuator from the engaged position to the neutral position, and then the second from neutral to an engaged position. Since, unlike the engaged positions, the neutral position is not defined by an abutment, the amount of hydraulic fluid applied to the first actuator must be carefully metered in order to ensure that the neutral position is reached exactly. In order to avoid overshooting, hydraulic fluid must be supplied at a low rate when approaching the neutral position. Therefore, switching over between pre-selected third and fifth gears takes much longer and is much more complicated to control than a switchover between pre-selected first and third gears.

At least one object of the present invention is to provide a transmission for a motor vehicle comprising a synchronizer which is displaceable between first and second engaged positions, in which a switchover between an engaged position and a neutral position of the synchronizer is just as simple to control and at least as quickly accomplished as a switchover between the engaged positions. In addition, other objects, desirable features, and characteristics will become apparent from the subsequent summary and detailed description, and the appended claims, taken in conjunction with the accompanying drawings and this background.

SUMMARY

The at least one object, and other objects, desirable features, and characteristics, are achieved by a transmission for a motor vehicle comprising at least first and second rotatable shafts, at least first and second pairs of meshing gearwheels, each of which comprises an idle gearwheel rotatably mounted on said second shaft, at least one synchronizer which is displaceable along said second shaft between first and second engaged positions in which it locks one of said idle gearwheels to said second shaft via a neutral position, and a hydraulic actuator for displacing the synchronizer, the actuator comprising a cylinder and a piston which is displaceable within the cylinder delimiting first and second chambers, the volume of the first chamber being smallest when the actuator is in the first engaged position and the volume of the second chamber being smallest when the actuator is in the second engaged position, wherein the piston further delimits at least a third chamber within the cylinder, the volume of which is smallest when the actuator is in a neutral position.

If a pressure applied to first and second chambers is higher than the pressure in the third chamber, the third chamber will be compressed, causing the piston to come to rest in the neutral position. No sensor is required for verifying that the piston is exactly at the neutral position, since due to the third chamber a high pressure applied to first and second chambers will lock the piston in the neutral position as reliably as a high pressure applied only to the first and second chamber would lock it in the second and first engaged positions, respectively.

The third chamber is preferably designed to reach its greatest volume when the actuator is in the first engaged position.

According to a practical embodiment, the piston may comprise a main member and a first extension member, the first extension member forming a barrier between first and third chambers and being supported by said main member if the piston is displaced from a neutral position towards the first engaged position.

For the actuator to be stable in the neutral position, the cylinder preferably comprises at least first and second portions, the second portion having a larger cross section than the first portion, the main member filling the cross section of said first portion, and the main member and the first extension member jointly filling the cross section of the second portion.

In order to facilitate control, the piston should be as fast in moving between the first engaged position and the neutral position as between the second engaged position and the neutral position, and pressures required for displacing the piston in different directions from the neutral position should be identical. To this effect, the actuator should preferably have a symmetrical design, in particular it is advantageous if there is a fourth chamber delimited within the cylinder by said piston, the volume of which is smallest when the actuator is in the neutral position and greatest when the actuator is in the second engaged position.

In order for the main member to move further towards the second engaged position than the first extension member, the first extension member preferably has an opening which exposes the main member directly to the pressure reigning in the first chamber, enabling the hydraulic fluid of the first chamber to push the piston main member forward even if it is not in contact with the first extension member.

For the neutral position to be reached easily and reliably, a valve assembly of the transmission preferably is capable of assuming, in addition to a first state in which it connects the first chamber to a source and the second chamber to a drain of hydraulic fluid, and a second state in which it connects the second chamber to the source and the first chamber to the drain, a third state in which it connects first and second chambers to said source.

Pressure regulators for applying hydraulic fluid at a first high pressure to one of said first and second chambers and hydraulic fluid at a second high pressure to the other chambers may serve various purposes. On one hand, the direction of displacement of the piston is controlled by the relationship of the first and second pressures, i.e. if the first pressure is highest, the piston moves towards the second engaged position, and if the second pressure is highest, it moves towards the first engaged position. Further, by decreasing the higher one of the two pressures while the piston is moving, the piston can be decelerated abruptly when it approaches a desired position, so that when the piston is remote from such a desired position it can be operated at a high speed. At such a high speed, a shift operation can be accomplished in a short time.

First and second engaged positions of a synchronizer preferably correspond to non-adjacent gears, so that while a given gear is active, pre-selection can be swapped from a gear higher than the active gear to a lower one and vice versa using just one synchronizer.

In a double clutch transmission having the first shaft and a third shaft for input shafts, the above mentioned first and second gearwheel pairs preferably comprise drive gearwheels which are mounted on said first shaft, i.e., both gears associated to said synchronizer are driven by the same input shaft.

A second synchronizer and a second actuator of the above-described type, in particular an actuator having the above-described third chamber, can be associated to third and fourth gearwheel pairs which comprise drive gearwheels mounted on said third shaft.

Again, in order to facilitate a change of pre-selection while a given gear is active, it is preferred that one of said first and second synchronizers is associated to odd-numbered gears, whereas the other synchronizer is associated to even-numbered gears.

The advantages of the above-described actuator are most apparent in a transmission in which the number of gearwheel pairs driven by said first shaft is at least three, i.e. there are at least the above-described synchronizer having the third chamber associated to first and second gearwheel pairs of said first shaft, and another synchronizer associated to the third gearwheel pair. In case of switching over between a gear associated to the first or second gearwheel pair and the gear associated to the third gearwheel pair, the synchronizer having the third chamber is quickly and easily placed in its neutral position, and subsequently the synchronizer of the third gearwheel is engaged.

If there are at least four gearwheel pairs driven by the first shaft, the third and fourth gearwheel pairs are preferably associated to a third actuator having said third chamber, too.

For controlling the shifting operations, the valve assembly preferably comprises a way valve which, in a first position connects first and second chambers of said first actuator to said pressure regulators while connecting first and second chambers of said third actuator to said source, and, in a second position connects first and second chambers of said third actuator to said pressure regulator while connecting first and second chambers of said first actuator to said source. In this way, while the actuator having chambers connected to the pressure regulators is displaceable, the other actuator is locked in its position.

Another way valve can be provided for connecting either said first or said second actuator to said pressure regulators.

BRIEF DESCRIPTION OF THE DRAWINGS

The present invention will hereinafter be described in conjunction with the following drawing figures, wherein like numerals denote like elements, and.

FIG. 3 is a schematic cross section of a hydraulic actuator used in the transmission of FIG. 1; and FIG. 4 is a table of states of the valve assembly of the transmission of FIG. 1.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
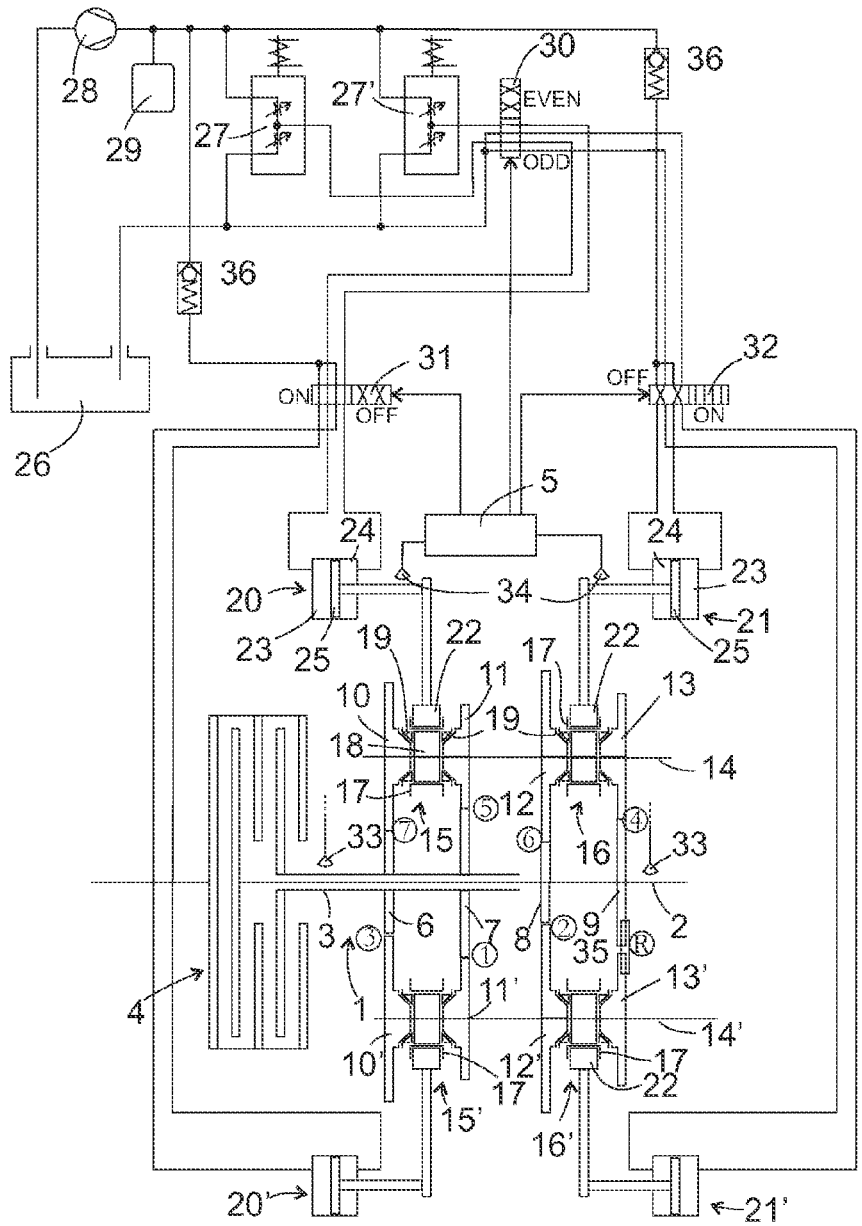
FIG. 1 is a schematic diagram of an automated manual transmission embodying an embodiment of the present invention.

FIG. 1 illustrates a double-clutch transmission (DCT) which is a preferred field of application of the present invention. It should be understood, though, that the invention is applicable to single clutch transmissions alike, where it can facilitate shifting between gears associated to different synchronizers, as the reader will readily understand from the following description An input shaft 1 of the transmission comprises two concentrically rotating shaft members, namely a solid shaft 2 and a hollow shaft 3, both of which carry a clutch plate of a double clutch 4. The double clutch 4 is adapted to be selectively engaged in order to transmit engine torque only to solid shaft 2 or only to hollow shaft 3.

Solid and hollow shafts 2, 3 carry a plurality of drive gearwheels 6 to 9 that mesh with driven gearwheels 10 to 13 and 10' to 13' which are rotatably mounted on first and second layshafts 14, 14', respectively. An output shaft, not shown, carries two gearwheels which mesh with pinions, not shown, of the layshafts 14, 14'. Gearwheel 13' does not mesh directly with drive gearwheel 9, but via an intermediate gearwheel 35, so that the three gearwheels 9, 35, 13' cooperate to form a reverse gear. Denominations of the various gears R, 1, 2, . . . , 7 are indicated in FIG. 1 next to the gearwheel pairs associated to each gear.

Between driven gearwheel pairs 10 and 11, 12 and 13, 10' and 11', 12' and 13', respectively, synchronizers 15, 16, 15', 16' are provided. The design of the synchronizers 15, 16, 15', 16' is familiar to the man of the art, comprising a shift sleeve 17 which is locked in rotation to a hub 18 on layshaft 14, 14' and is axially displaceable along said layshaft 14, 14' in order to engage one of the adjacent gearwheels 10, 11; 12, 13; 10', 11' or 12', 13' and lock it to the layshaft 14, 14', baulk rings 19 between the hub 18 and the adjacent gearwheels which are dragged along when shift sleeve 17 is displaced from its neutral position and which have an annular friction surface, and friction surfaces rigidly connected to the adjacent gearwheels, against which the annular friction surface of a baulk ring 19 is pressed when it is dragged along by shift sleeve 17 to the synchronizing position. While the two friction surfaces are not yet synchronized, the baulk ring 19 blocks further progress of the shift sleeve 17 towards an engaged position in which it locks the gearwheel to the layshaft 14, 14'.

Each synchronizer 15, 16, 15', 16' has a hydraulic actuator 20, 21, 20', 21' associated to it for displacing a shift fork 22 that engages shift sleeve 17. The actuators 20, 21, 20', 21' are double-acting hydraulic cylinders having first and second chambers 23, 24 at either side of a displaceable piston 25 connected to shift fork 22. Each synchronizer 20, 21, 20', 21' has a Hall sensor 34 associated to it for monitoring a displacement of its shift fork 22 to the left, towards gearwheel 10, 10' or 12, 12' and to the right, towards gearwheel 11, 11' or 13, 13'4. For detecting displacements into different directions, two magnets are placed on each shift fork 22 or piston rod so that one of them is detected when the shift fork 22 is displaced from neutral to the left, and the other when the shift fork 22 is displaced from neutral to the right. The magnets may differ in field strength and/or orientation, so that from polarity and/or amplitude of the Hall sensor signal the detected magnet can be recognized.

Hydraulic circuitry for operating the actuators 20, 21, 20', 21' comprises a reservoir 26 for unpressurized hydraulic fluid, a pump 28 which draws fluid from reservoir 26, an accumulator 29 connected to the output of pump 28, control valves 27, 27', each of which has one port connected to the output side of pump 28, another port connected to reservoir 26 and a pressure-controlled port selectively connected to the actuators 20, 21, 20', 21' via way valves 30, 31, 32.

Way valve 30 is directly connected to the pressure-controlled ports of control valves 27, 27' and to reservoir 26 and has two positions in which either way valve 31 receives controlled output pressures from control valves 27, 27' and way valve 32 is connected to reservoir 26, or vice versa. Control valves 27, 27' and way valves 30, 31, 32 are controlled by an electronic transmission controller 5. Since way valve 31 controls actuators 15. 15' associated to odd-numbered gears and way valve 32 controls actuators 16, 16' associated to odd-numbered gears, the position in which way valve 30 supplies controlled output pressures to way valve 31 will be referred to as ODD in the following, whereas the other position is referred to as EVEN.

Way valves 31, 32 are shown in FIG. 1 with two positions each, which for convenience will be referred to as ON and OFF in the following, but in general the number of positions corresponds to the number of synchronizers associated to gearwheels driven via hollow shaft 3, such as synchronizers 15, 15', whereas the number of positions of way valve 32 corresponds to the number of synchronizers, such as synchronizers 16, 16' associated to gearwheels driven by solid shaft 2. Way valve 31 is shown in the ON position, in which it communicates outputs of way valve 30 to the first and second chambers of actuator 20, whereas actuator 21 has a background pressure applied to it which is derived from the output of pump 28 by a pressure reducer 36. In the OFF position of way valve 31, actuator 20 receives the background pressure, whereas actuator 20' is connected to way valve 30. Way valve 32 is shown in the OFF position, in which it connects actuator 21 to way valve 30 and actuator 21' to background pressure, and in its ON position it applies background pressure to actuator 21 and outputs of way valve 30 to actuator 21'.

Figure 2:
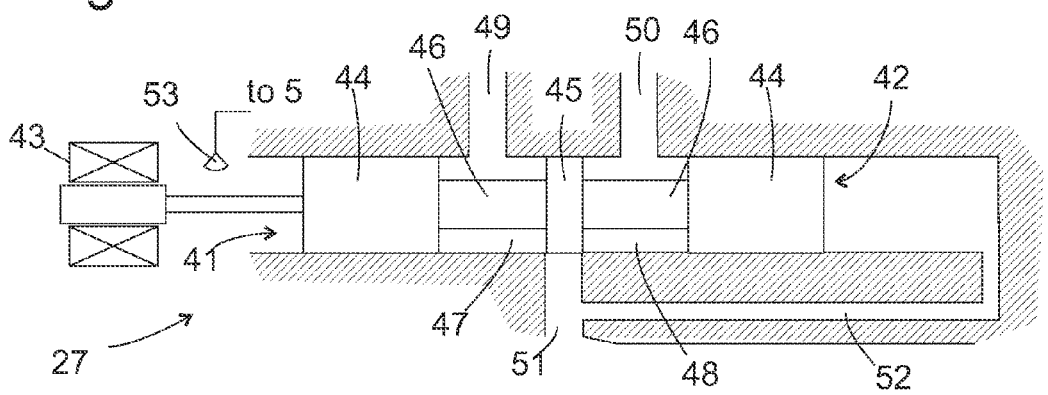
FIG. 2 is a schematic cross section of a pressure controller used in the transmission of FIG. 1.

FIG. 2 schematically illustrates the structure of control valves 27, 27'. Within a cylindrical chamber 41 a piston 42 is displaceable by means of a solenoid 43. The piston 42 has end sections 44 and an intermediate section 45 which fill the cross section of chamber 41, and reduced diameter sections 46 between the intermediate section 45 and each end section 44.

The reduced diameter sections 46 define cavities 47 within chamber 41, one of which communicates with high-pressure port 49 of the control valve 27, 27', whereas the other communicates with low-pressure port 50. In the configuration shown, the pressure-controlled port 51 is blocked by intermediate section 45. A feedback duct 52 extends from pressure-controlled port 51 to the end of chamber 1 opposite to solenoid 43.

The solenoid 43 applies a force to piston 42 which is proportional to the intensity of a current flowing through solenoid 43. If the force is directed to the right in FIG. 2, the piston is displaced to the right so that high-pressure port 49 and pressure-controlled port 51 come to communicate. A flow of hydraulic fluid results, and the pressure at pressure-controlled port 51 increases until the pressure communicated to the right-hand end of piston 42 by feedback duct 52 compensates the force of solenoid 43. Conversely, if the solenoid applies a force directed to the left, hydraulic fluid is drained from pressure-controlled port 51 to low-pressure port 50 until the pressure decrease at the right-hand end of piston 42 compensates the force. In this way, a pressure is established at the pressure-controlled port 51 which is a direct function of the current in solenoid 43.

The control valve of FIG. 2 is advantageous for the present invention in that it allows control of the force applied to the shift sleeve 17 in a simple open control loop. Of course, other types of control valves could also be used, if necessary in combination with a pressure sensor by which the force applied to shift sleeve 17 could be controlled in a closed loop.

FIG. 3 illustrates structure and operation of the actuators 20, 21, 20', 21' by means of two cross sections. FIG. 3A shows an actuator close to its first engaged position, whereas FIG. 3B illustrates the neutral position.

Each actuator 20, 21, 20', 21' comprises a hollow cylinder 61 which is divided into three portions 62, 63, 64 having different cross sections. A displaceable piston 65 delimits first and second chambers 23, 24. In the configuration of FIG. 3A, the first chamber occupies portion 62 and part of portion 63, whereas chamber 24 occupies part of portion 64. A piston rod 66 connected to shift fork 22 extends through second chamber 24. The cross section of portion 64 is larger than that of portion 62 by the cross section of the piston rod 66. Portion 63 has a smaller cross section than the other two portions 62, 64.

Piston 65 comprises a main member 67 of overall cylindrical shape, which is displaceably and sealingly guided in the narrow portion 63 Annular extension members 68, 69 having a larger diameter than main member 67 are provided at each end of main member 67. The peripheries of extension members 68, 69 are in sealing contact with the walls of cylinder portions 62, 64, respectively. The extension member 68 of first chamber 23 is shown abutting against a shoulder 70 of narrow portion 63. Main member 67 is separate from extension member 68, and is displaced to the left so that first chamber 23 extends far into the narrow portion 63. At the left hand side of the narrow portion 63, between its left-hand shoulder 71 and extension member 67, an annular chamber 72 is formed which communicates with neither of the two supply lines 73, 74 which connect chambers 23, 24 to way valve 31 or 32. In chamber 72, there may be a vacuum, or low pressure e.g., atmospheric pressure, supplied by a bore in the wall of cylinders 61, not shown.

In order to hold the piston 62 in the configuration shown in FIG. 1, the pressure in chamber 23 has to be higher than that in chamber 24, so that the total force acting on the right end surface of main member 67 compensates a pressure of the second chamber 24 acting on the combined surfaces of main member 67 and extension member 69. If a same pressure is applied to chambers 23, 24, chamber 72 will vanish, leaving the actuator in the configuration shown in FIG. 3B. Therefore, no sensor is necessary for verifying that the actuator is in its neutral position. If identical or at least substantially identical pressures are applied at both supply lines 73, 74, the neutral position of FIG. 3B is the only stable position.

If chamber 24 was supplied with a substantially higher pressure than chamber 23, the piston 65 would move to the right, leaving extension member 69 at shoulder 71, and an annular chamber analogous to chamber 72 would open between shoulder 70 and extension member 68.

Since the three way valves 30, 31, 32 have two positions each, there is a total of eight different combinations of way valve positions, the effects of which will be described referring to FIG. 4. Referring to FIG. 1, way valve 30 is shown in the ODD position, and way valve 31 is shown in the ON position, and way valve 32 is OFF. By tracing the hydraulic lines in FIG. 1, it can be verified that if control valve 27 outputs high pressure and control valve 27' outputs a pressure which is sufficiently less than that of control valve 27 to enable displacement of the actuators, actuator 20 will move to the left, engaging gear 5. By outputting a higher pressure from control valve 27' and a lower pressure from control valve 27, gear 7 might be engaged. Therefore, in the line of FIG. 4 associated to the valve configuration ODD, ON, OFF of FIG. 1 gears 5 and 7 are labeled as "ready" (for engagement).

When one of gears 5, 7 is engaged, one of the gears associated to synchronizers 16, 16' can be pre-selected. By switching over way valve 30 in to the EVEN position, control valves 27, 27' are connected to actuator 21, enabling pre-selection of gear 6 or gear 4. Accordingly, these gears are labeled "standby" in the third line of FIG. 4.

Since lines 3 and 7 of FIG. 4 differ only by the state of way valve 30, it is readily understood that gears labeled "ready" in line 3 are labeled "stand by" in line 7 and vice versa.

So, if gear 7 or gear 5 was activated, pre-selection of adjacent gears 4 or 6 is possible by simply switching over way valve 30, and similarly, gears 5 and 7 can be pre-selected when gears 6 or 4 are active. If gear 4 has been activated (which could be done, as easily seen from FIG. 4) with way valves 30, 31 in the ON position, it is desirable that either gear 3 or gear 5 van be pre-selected. With way valves 31, 32 ON, gear 3 can be preselected, whereas with way valve 31 ON and way valve 32 OFF, pre-selection of gear 5 is possible. It can be easily verified that with any given active gear both adjacent gears can be pre-selected by switching one or two way valves.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A transmission for a motor vehicle, comprising:
   a first rotatable shaft;
   a second rotatable shaft;
   a first pair of meshing gearwheels and a second pair of meshing gearwheels; each of the first pair of meshing gearwheels comprises a first idle gearwheel rotatably mounted on said second rotatable shaft and the second pair of meshing gearwheels comprises a second idle gearwheel rotatably mounted on said second rotatable shaft;
   a first synchronizer that is displaceable along said second rotatable shaft between a first engaged position and a second engaged position that locks one of said first idle gearwheel or said second idle gearwheel to said second rotatable shaft via a neutral position;
   a hydraulic actuator for displacing the synchronizer, the hydraulic actuator comprising a cylinder and a piston that is displaceable within the cylinder and delimiting a first chamber and a second chamber, a first volume of the first chamber being smallest when the hydraulic actuator is in the first engaged position and a second volume of the second chamber being smallest when the hydraulic actuator is in the second engaged position,
   wherein the piston further delimits a third chamber within the cylinder, the third volume of which is smallest when the hydraulic actuator is in the neutral position and the piston further delimits a fourth chamber within the cylinder, the volume of which is smallest when the hydraulic actuator is in the neutral position and greatest when the hydraulic actuator is in the second engaged position.

2. The transmission of claim 1, wherein the third volume of the third chamber is greatest when the hydraulic actuator is in the first engaged position.

3. The transmission of claim 1, wherein the piston comprises a main member and a first extension member, the first extension member forming a barrier between first and third chambers and being supported by said main member if the piston is displaced from the neutral position towards the first engaged position.

4. The transmission of claim 3, wherein the cylinder comprises a first portion and a second portion, the second portion having a larger cross section than the first portion, the main member filling a first cross section of said first portion, and the main member and the first extension member jointly filling a second cross section of the second portion.

5. A transmission for a motor vehicle, comprising:
   a first rotatable shaft;
   a second rotatable shaft;
   a first pair of meshing gearwheels and a second pair of meshing gearwheels; each of the first pair of meshing gearwheels comprises a first idle gearwheel rotatably mounted on said second rotatable shaft and the second pair of meshing gearwheels comprises a second idle gearwheel rotatably mounted on said second rotatable shaft;
   a first synchronizer that is displaceable along said second rotatable shaft between a first engaged position and a second engaged position that locks one of said first idle gearwheel or said second idle gearwheel to said second rotatable shaft via a neutral position;
   a hydraulic actuator for displacing the synchronizer, the hydraulic actuator comprising a cylinder and a piston that is displaceable within the cylinder and delimiting a first chamber and a second chamber, a first volume of the first chamber being smallest when the hydraulic actuator is in the first engaged position and a second volume of the second chamber being smallest when the hydraulic actuator is in the second engaged position; and
   a valve assembly, the valve assembly having a first state that connects the first chamber to a source and the second chamber to a drain of hydraulic fluid, a second state which connects the second chamber to the source and the first chamber to the drain, and a third state which connects the first chamber and the second chamber to said source, wherein the piston further delimits a third chamber within the cylinder, the third volume of which is smallest when the hydraulic actuator is in the neutral position.

6. The transmission of claim 5, wherein the valve assembly comprises one or more pressure regulators for applying hydraulic fluid at a first high pressure to one of said first chamber or said second chambers and hydraulic fluid at a second high pressure to the other chamber.

7. The transmission of claim 6, wherein said valve assembly comprises a way valve that in a first position connects the first chamber and the second chamber of said hydraulic actuator to a pressure regulator while connecting the first chamber and the second chamber of said third actuator to said source, and in a second position, connects the first chamber and the second chamber of said third actuator to said pressure regulator while connecting the first chamber and the second chamber of said hydraulic actuator to said source.

8. The transmission of claim 6, wherein the valve assembly further comprises a way valve for connecting either said hydraulic actuator or said second actuator to said pressure regulators.

9. The transmission of claim 5, wherein the first engaged position and the second engaged position corresponds to non-adjacent gears.

10. The transmission of claim 5, wherein the first rotatable shaft and a third rotatable shaft are input shafts, and said first pair of meshing gearwheels and said second pair of meshing gearwheels comprise a plurality of drive gearwheels mounted on said first rotatable shaft.

11. The transmission of claim 10, wherein a second synchronizer and a second actuator having said third chamber is associated to a third gearwheel pair and a fourth gearwheel pair comprising a second plurality of drive gearwheels mounted on said third shaft.

12. The transmission of claim 11, wherein one of said first synchronizer or said second synchronizer is associated to odd-numbered gears, whereas the other synchronizer is associated to even-numbered gears.

13. The transmission of claim 11, wherein at least four gearwheel pairs are driven by said first rotatable shaft, the third gearwheel pair and the fourth gearwheel pair associated to a third actuator having said third chamber.

14. The transmission of claim 10, wherein a number gearwheel pairs driven by said first rotatable shaft is at least three.

* * * * *